United States Patent Office 2,922,742
Patented Jan. 26, 1960

2,922,742

METHOD AND COMPOSITION FOR THE CONTROL OF FUNGUS ORGANISMS

Richard H. Gruenhagen, Midland, Mich., assignor to The Dow Chemical Company, Midland, Mich., a corporation of Delaware No Drawing. Application April 4, 1957
Serial No. 650,546

11 Claims. (Cl. 167—30)

This invention is concerned with fungicides and is particular directed to compositions and methods for the control of fungus organisms.

It is an object of the present invention to provide a new method for the control of many common fungi. A further object of the present invention is the provision of an improved method wherein novel compositions are employed for fungus control. An additional object is to provide a composition which is adapted to be applied to the aerial portions of plants for the control of plant fungi without substantial injury to the plant foliage. Additional objects will become apparent from the following specification and claims.

In accordance with the present invention, it has been discovered that bicyclohexyl-4-amine and its inorganic acid salts are effective fungicides and are adapted to be employed for the control of a wide range of fungi. These amine compounds of the group consisting of bicyclohexyl-4-amine and its inorganic acid salts are crystalline solids readily soluble in many organic solvents and of low solubility in water. They are adapted readily and conveniently to be employed for the control of many fungal organisms and particularly those organisms ordinarily found on the aerial portions of plants. The compounds may also be applied in dormant applications to the woody surfaces of plants or to orchard floor surfaces for the control of the overwintering spores of many fungi. It is an advantage of the present invention that compositions containing these compounds may be applied to growing vegetation in amounts required for effective control without significant injury to the plants. It is a further advantage that a single application of the compounds will provide a residual and extended control of fungi over a period of several months.

In carrying out the method of the present invention the undesirable fungal organisms may be controlled by contacting the organisms and/or their habitats with a parasiticidal amount of the unmodified bicyclohexyl-4-amine or its inorganic acid salts. However, the present invention also embraces the employment of a liquid, powder or dust composition containing one or more of the toxicants. Such compositions are adapted to be applied to the living plants without substantial injury to the plants. In preparing toxicant compositions, the amine compounds may be modified with one or more of a plurality of additaments including organic solvents, petroleum distillates, water or other liquid carriers, surface active dispersing agents and finely divided inert solids. Depending upon the concentration in the composition of the amine product, such augmented compositions are adapted to be employed for the control of the undesirable fungi or employed as concentrates and subsequently diluted with additional inert carrier to produce the ultimate treating compositions. In compositions to be employed as concentrates, the amine toxicants oftentimes are present in a concentration from about 5 to 95 percent by weight.

The exact concentration of the bicyclohexyl-4-amine or its inorganic acid salts employed in the compositions for application to the fungus organisms and/or their habitats may vary provided a fungicidal dosage of toxicant is supplied either on the organism or its environment. This dosage of toxicant is primarily dependent upon the susceptibility of the particular organism to the amine product. In general, good results are obtained with liquid compositions containing from about 0.001 to 2.0 percent by weight of toxicant, although compositions containing as much as 50 percent by weight may be applied to orchard floor surfaces for the control of spores. With dusts, good results are obtained with compositions containing from 0.01 to 5.0 percent or more by weight of toxicant. Where the compositions are to be applied to living plants, it is preferred that the toxicant be present in an amount not to exceed about 0.8 percent in liquid compositions and 1.0 percent in dusts.

In the preparation of dust compositions, the toxicant products may be compounded with any of the finely divided solids such as pyrophyllite, talc, chalk, gypsum and the like. In such operations, the finely divided carrier is ground or mixed with the toxicant or wet with a solution of the toxicant in a volatile organic solvent. Similarly, dust compositions containing the products may be compounded with various solid surface active dispersing agents, such as fuller's earth, bentonite, attapulgite, and other clays. Depending upon the proportions of ingredients these dust compositions may be employed as concentrates and subsequently diluted with additional solid surface active dispersing agent or with pyrophyllite, chalk, talc, gypsum and the like to obtain the desired amount of active ingredient in a composition adapted to be employed for the control of fungi. Also, such concentrate dust compositions may be dispersed in water, with or without the aid of dispersing agents to form spray mixtures.

Further, the amine compounds or a liquid or dust concentrate composition containing such compounds may be incorporated in intimate mixture with surface-active dispersing agents such as ionic and non-ionic emulsifying agents to form spray concentrates. Such concentrates are readily dispersible in liquid carriers to form sprays containing the toxicants in any desired amount. The choice of dispersing agents and amounts thereof employed are determined by the ability of the agents to facilitate the dispersion of the concentrate in the liquid carrier to produce the desired spray compositions.

Similarly, the toxicant products may be compounded with a suitable water-immiscible organic liquid and a surface active dispersing agent to produce emulsifiable concentrates which may be further diluted with water and oil to form spray mixtures in the form of oil-in-water emulsions. In such compositions, the carrier comprises an aqueous emulsion, i.e. a mixture of water immiscible solvent, emulsifying agent and water. Preferred dispersing agents which may be employed in these compositions are oil-soluble and includes the non-ionic emulsifiers such as the condensation products of alkylene oxides with the inorganic acids, polyoxyethylene derivatives of sorbitan esters, complex ether alcohols and the like. However, oil-soluble ionic emulsifying agents such as mahogany soaps may also be used. Suitable organic liquids which may be employed in the composition include petroleum oils and distillates, toluene, liquid halohydrocarbon and synthetic organic oils. The surface active dispersing agents are usually employed in liquid compositions in the amount of from 1 to 20 percent by weight of the combined weight of the dispersing agent and active compound.

When operating in accordance with the present invention, the amine compounds or a composition containing the compounds may be applied to the fungus organisms to be controlled, or to their habitats in any convenient fashion, e.g., by means of hand dusters or sprayers. Applications to the above ground portions of plants conveniently may be carried out with power dusters, boom sprayers and spray dusters. In foliar applications, the employed compositions should not contain any appreciable amount of any phytotoxic diluents. In large scale operations, dusts or low volume sprays may be applied from airplanes.

The following examples illustrate the present invention but are not to be construed as limiting its scope.

*Example 1*

Twenty-five parts by weight of bicyclohexyl-4-amine-hydrochloride α-isomer (melting at 295°–300°) is mixed and ground with 71 parts of fuller's earth, 2 parts of an alkyl aryl sulfonate (Nacconol NR), and 2 parts of a substituted benzoid alkyl sulfonic acid (Daxad No. 27) to prepare a concentrate composition in the form of a wettable powder. In a similar manner, other amine concentrate compositions are prepared by employing one of bicyclohexyl-4-amine-hydroiodide α-isomer, mono (bicyclohexyl-4-amine)-sulfate α-isomer, bis (bicyclohexyl-4-amine)-chromate α-isomer, bis (bicyclohexyl-4-amine)-molybdate β-isomer, and mono (bicyclohexyl-4-amine)-phosphate α-isomer in place of the bicyclohexyl-4-amine hydrochloride.

In a like manner, a wettable powder concentrate composition is prepared by mixing and grinding together 25 parts by weight of bicyclohexyl-4-amine-hydrochloride β-isomer (melting at 228°–32° C.), 16.5 parts of zinc sulfate, 2 parts of an alkyl aryl sulfonate (Nacconol NR), 2 parts of Daxad 27 and 54.5 parts of fuller's earth.

Also, 90 parts by weight of mono(bicyclohexyl-4-amine)-chromate α-isomer (melting at 127°–129° C.) and 10 parts by weight of a sorbitan monolaurate polyoxyethylene derivative (Tween 20) are mixed together to prepare a water-dispersible concentrate composition. In a similar manner, other water dispersible concentrates may be prepared by employing one of bicyclohexyl-4-amine β-isomer, mono-(bicyclohexyl-4-amine)-sulfate β-isomer, bicyclohexyl-4-amine-nitrate β-isomer and bicyclohexyl-4-amine-hydroiodide β-isomer in place of the mono (bicyclohexyl-4-amine)-chromate.

These concentrate compositions may be dispersed in water to provide aqueous compositions having very desirable wetting properties. The latter aqueous compositions are adapted to be employed to distribute the bicyclohexyl-4-amine salt compounds in fungicidal amounts.

*Example 2*

A water dispersible concentrate composition was prepared by mixing and grinding together in a ball mill 0.06 part by weight of bicyclohexyl-4-amine hydrobromide α-isomer (melting at 229°–231° C.), 0.06 part of an alkyl aryl sulfonate (Nacconol NR) and 0.06 part of Daxad No. 27 and 200 parts of water. A portion of this concentrate was diluted with water to form aqueous spray compositions containing ⅛ and 1/32 pound of the salt compound per 100 gallons of ultimate composition.

The latter spray compositions were sprayed with an atomizing spray nozzle using air pressure at 20 pounds per square inch on young tomato plants 3 to 5 inches high. The applications were carried out so as to give thorough coverage of all surfaces of the leaves of the plants without appreciable run off. Following the application, the spray composition was allowed to dry upon the leaf surfaces and the plants then inoculated by spraying with an aqueous suspension of viable spores of *Alternaria solani*, the casual organism of tomato early blight. Untreated tomato plants were similarly inoculated to serve as checks. Immediately following the inoculation, all plants were placed in a moist chamber and maintained at 70° F. under saturated humidity conditions for 24 hours. Thereafter, the plants were placed in a shaded greenhouse for 48 hours and then observed for leisons caused by the blight organism. The dosages at which the amine salt was employed together with the results of the observation expressed as percent control of *Alternaria solani* are set forth in the following table.

| Concentration of (Bicyclohexyl)-4-amine hydrobromide in Pounds Per 100 Gallons of Spray Composition | Percent Control of *Alternaria solani* |
|---|---|
| ⅛ | 100 |
| 1/32 | 82 |

At the time of the observations, the check plants were found to be heavily covered with lesions attributable to *Alternaria solani*.

*Example 3*

A water dispersible liquid concentrate was prepared by mixing and grinding together in a ball mill 0.06 part by weight of bicyclohexyl-4-amine-nitrate alpha isomer (melting at 235° C.) 0.06 part of Daxad No. 27, 0.06 part of Nacconol NR and 200 parts of water. A portion of this concentrate was dispersed in water to prepare aqueous spray compositions containing 1/32 and ⅛ pound of the nitrate compound per 100 gallons of ultimate mixture. These compositions were employed exactly as described in Example 2 for the control of tomato early blight on tomato plants. The results obtained in these operations are set forth in the following table.

| Concentration of Bicyclohexyl-4-amine-nitrate in Pounds Per 100 Gallons of Spray Mixture | Percent Control of *Alternaria solani* |
|---|---|
| ⅛ | 99 |
| 1/32 | 93 |

At the time of the observations, the check plants were found to be heavily covered with lesions attributable to *Alternaria solani*.

*Example 4*

A water dispersible liquid concentrate was prepared by mixing and grinding together in a ball mill 0.06 by weight of bis(bicyclohexyl-4-amine)-sulfate alpha isomer, 0.06 part of Daxad No. 27, 0.06 part of Nacconol NR and 200 parts of water.

In a similar manner, other dispersible liquid concentrates were prepared from bicyclohexyl-4-amine and various inorganic salts of bicyclohexyl-4-amine. Portions of these concentrate compositions were dispersed in water to prepare spray compositions containing ⅛ pound of one of the amine toxicants per 100 gallons of ultimate mixture. These spray compositions were employed exactly as described in Example 2 for the control of tomato early blight. The results obtained in these operations are set forth in the following table.

| Active Ingredient | Percent Control of *Alternaria solani* |
|---|---|
| Bicyclohexyl-4-amine alpha isomer (melting at 58°–62° C.) | 92 |
| Bicyclohexyl-4-amine,hydrochloride alpha isomer | 99 |
| Bicyclohexyl-4-amine,hydrochloride beta isomer | 86 |
| Bicyclohexyl-4-amine,hydrobromide alpha isomer (melting at 229°–231° C.) | 98 |
| Mono(bicyclohexyl-4-amine)-chromate alpha isomer | 91 |
| Mono(bicyclohexyl-4-amine)-chromate beta isomer (melting at 127°–129° C.) | 84 |
| Bis(bicyclohexyl-4-amine)-sulfate alpha isomer | 100 |
| Bis(bicyclohexyl-4-amine)-sulfate beta isomer (melting at 283°–285° C.) | 99 |
| Mono(bicyclohexyl-4-amine)-molybdate alpha isomer | 98 |

At the time of the observations, the check plants were found to be heavily covered with lesions attributable to *Alternaria solani*.

Example 5

A portion of water dispersible concentrate composition containing 0.50 part by weight of bicyclohexyl-4-amine-hydrobromide α-isomer, 2 parts of Nacconol NR, 2 parts of Daxad No. 27 and 200 parts of water is dispersed in water to prepare an aqueous spray composition containing one pound of the hydrobromide ingredient per 100 gallons of ultimate mixture. This composition is applied in an apple orchard to the trunks and branches of dormant trees and to the ground floor beneath the trees for the control of the over wintering spores of apple scab. The application is carried out with conventional spraying equipment, the spray composition being applied to the trees in an amount sufficient to provide for appreciable run off. Unsprayed check trees are maintained in the orchard to provide for a continuous source of reinfestation. Six weeks following bloom, the trees are examined and compared with the untreated check trees to determine what control of apple scab had been obtained. As a result of the observations there is found a commercial control of apple scab with heavy infestation on the untreated checks.

Example 6

A wettable powder concentrate was prepared by mixing and grinding together 25 parts by weight of bicyclohexyl-4-amine-hydrochloride alpha isomer, 54.5 parts of fuller's earth, 16.5 parts of zinc sulfate, 2 parts of Nacconol NR and 2 parts of Daxad No. 27. A portion of this concentrate was dispersed in water to prepare an aqueous spray composition containing one pound of the amine hydrochloride compound per 100 gallons of ultimate mixture. This spray composition was applied as a summer spray in an orchard of bearing cherry trees. The application was made with a conventional spray rig and in such amount as to provide for appreciable run-off from the treated leaf and woody surfaces of the trees. Unsprayed check trees were maintained in the orchard to provide a continuous source of reinfestation. Four months following the applications, the trees were subjected to randomized sampling and individual leaves examined to determine the percent control of cherry leaf spot. As a result of the observations, there was found an 85 percent control of cherry leaf spot on the treated trees with heavy infestation in the untreated checks.

Example 7

A water dispersible concentrate composition was prepared by mixing and grinding together in a ball mill 0.24 part by weight of a bicyclohexyl-4-amine-hydrochloride α-isomer, 0.06 part Daxad 27, 0.06 part Nacconol NR and 200 parts of water.

In a similar manner other dispersible concentrate compositions were prepared from various inorganic salts of bicyclohexyl-4-amine. Portions of these concentrate compositions were dispersed in water to prepare aqueous spray compositions containing ½ pound of one of the amine toxicants per 100 gallons of ultimate mixture. These spray compositions were sprayed with an atomizing spray nozzle using a pressure at 20 pounds per square inch on stands of wheat in the early two leaf stage. The applications were carried out so as to give thorough coverage of all surfaces of the plants. Twenty-four hours following the applications the plants were inoculated with an aqueous suspension of the spores of *Puccinia graminis tritici*, the casual organism of wheat rust. Untreated stands of wheat in the early two leaf stage were similarly inoculated to serve as checks. Immediately following the inoculation, all plants were placed in a moist chamber and maintained at 40° F. under saturated humidity conditions for 24 hours. Thereafter the plants were placed in a greenhouse for ten days and then observed for the development of wheat rust. The results obtained in these operations are set forth in the following table:

| Test Compound | Percent Control of Wheat Rust |
|---|---|
| Bicyclohexyl-4-amine hydrochloride α-isomer | 88 |
| Bicyclohexyl-4-amine-nitrate α-isomer | 88 |
| Bis(bicyclohexyl-4-amine)sulfate β-isomer | 85 |

At the time of observation, the check plants were heavily infested with wheat rust.

The bicyclohexyl-4-amine as employed in accordance with the present invention occurs in two isomeric forms known as the alpha and beta isomers. These two isomers may be prepared by known methods. In such methods, 4-cyclohexylcyclohexanol is dehydrogenated over a copper catalyst at 300° C. to form 4-cyclohexylcyclohexanone, and this product thereafter ammoniated to form a 4-cyclohexyl-cyclohexanone amine. The latter is thereafter hydrogenated over a nickel catalyst at 60° C. and 75 pounds pressure per square inch to give a reaction mixture containing about equal amounts of the alpha and beta isomers of bicyclohexyl-4-amine. The hydrogen chloride salt of the beta isomer of the amine is soluble in chloroform while the hydrogen chloride salt of the alpha isomer of the amine is substantially insoluble in chloroform. Thus, the isomeric amines may be separated in the form of their hydrogen chloride salts, and the salts thereafter converted to the free amine. The hydrogen chloride salts of the alpha and beta isomers of the amine melt at 295°–300° C. and 228°–232° C., respectively, while the alpha isomer of the amine melts at 58°–62° C. and the beta isomer of the amine melts at 32° C.

The bicyclohexyl-4-amine salt compounds as employed in accordance with the present invention conveniently may be prepared by reacting bicyclohexyl-4-amine with an inorganic acid such as hydrochloric acid, hydrobromic acid, hydroiodic acid, sulfuric acid, nitric acid, chromic acid, chloric acid, molybdic acid or phosphoric acid.

When carrying out the reaction between the bicyclohexyl-4-amine and acid, the salt compounds are produced in the form of the mono- or polyamine salts of the acids depending upon the basicity of the employed acid as well as upon the molecular proportions in which the amine and acid reactants are employed. Thus, for example, when a mono- or polybasic acid is employed with an equimolecular amount of bicyclohexyl-4-amine, the mono-amine salt of the acid is produced. Similarly, when two or three molecular proportions of bicyclohexyl-4-amine are employed with one molecular proportion of a dibasic or tribasic acid, the bis(amine) salt of the dibasic acid, or the bis amine salt of tris(amine) salt of the tribasic acid, respectively, are obtained. In carrying out the reaction, the bicyclohexyl-4-amine is contacted portionwise with the inorganic acid in a reaction solvent such as water or ethanol and at a temperature of from 20° to 100° C. Upon completion of the reaction, the reaction mixture may be cooled and filtered to separate the desired salt product.

I claim:

1. A method which comprises applying to fungal organisms and their horticultural habitats a fungicidal amount of amine compound selected from the group consisting of bicyclohexyl-4-amine and its inorganic acid salts.

2. A method claimed in claim 1 wherein said amine compounds are employed in the form of a composition comprising said compounds in intimate admixture with a parasiticide adjuvant as a carrier thereof.

3. A method claimed in claim 1 wherein said amine compound is bicyclohexyl-4-amine α-isomer.

4. A method claimed in claim 1 wherein said amine compound is bicyclohexyl-4-amine hydrochloride α-isomer.

5. A method claimed in claim 1 wherein said amine compound is bicyclohexyl-4-amine hydrobromide α-isomer.

6. A method claimed in claim 1 wherein said amine compound is bis(bicyclohexyl-4-amine)sulfate α-isomer.

7. A method claimed in claim 1 wherein said amine compound is bicyclohexyl-4-amine nitrate α-isomer.

8. A fungicidal concentrate composition comprising an amine compound selected from the group consisting of bicyclohexyl-4-amine and its inorganic acid salts in intimate admixture with an inert fungicidal adjuvant.

9. A fungicidal concentrate composition comprising an amine compound selected from the group consisting of bicyclohexyl-4-amine and its inorganic acid salts as an active ingredient in intimate admixture with from 1 to 20% by weight of a surface-active dispersing agent.

10. A fungicidal concentrate composition comprising an amine compound selected from the group consisting of bicyclohexyl-4-amine and its inorganic acid salts as an active ingredient in intimate admixture with from 5 to 95% by weight of a finely divided inert solid.

11. An aqueous dispersion of the composition of claim 9, the active ingredient being present in such composition in an amount of at least 0.001% by weight.

References Cited in the file of this patent

UNITED STATES PATENTS

| | | |
|---|---|---|
| 2,606,926 | Kirby | Aug. 12, 1952 |
| 2,606,928 | Barkdoll | Aug. 12, 1952 |
| 2,636,902 | Taylor | Apr. 28, 1953 |

OTHER REFERENCES

Horsfall: Fung. and Their Action, vol II, Chronica Botanica Co., 1945, p. 131.

Frear: Chem. of Insect., Fung. and Herb., 2nd ed., 1948, D. Van Nostrand Co., pp. 280–287.